United States Patent
Uvez et al.

(10) Patent No.: US 7,043,737 B1
(45) Date of Patent: May 9, 2006

(54) CLIENT SIDE INTEGRATION FOR NETWORK BASED AND NON NETWORK BASED APPLICATION

(75) Inventors: Kursat Uvez, San Francisco, CA (US); Domingo Mihovilovic, Menlo Park, CA (US); Atul Suklikar, San Carlos, CA (US); Jesse Ambrose, San Jose, CA (US); Zviad Jakhua, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 428 days.

(21) Appl. No.: 09/846,712

(22) Filed: Apr. 30, 2001

(51) Int. Cl.
*G06F 9/54* (2006.01)

(52) U.S. Cl. .................. 719/317; 719/315; 719/313

(58) Field of Classification Search ............... 709/312; 719/313, 310, 201–203, 317, 315
See application file for complete search history.

(56) References Cited

U.S. PATENT DOCUMENTS

| | | | | |
|---|---|---|---|---|
| 5,404,534 A | * | 4/1995 | Foss et al. ............... | 709/315 |
| 5,761,673 A | * | 6/1998 | Bookman et al. ......... | 719/311 |
| 5,802,530 A | * | 9/1998 | Van Hoff ................. | 715/513 |
| 5,896,533 A | * | 4/1999 | Ramos et al. ............ | 709/217 |
| 5,903,720 A | * | 5/1999 | Stokes ..................... | 713/200 |
| 5,956,483 A | * | 9/1999 | Grate et al. .............. | 709/203 |
| 6,101,510 A | * | 8/2000 | Stone et al. .............. | 715/513 |
| 6,192,415 B1 | * | 2/2001 | Haverstock et al. ...... | 709/245 |
| 2001/0020243 A1 | * | 9/2001 | Koppolu et al. ......... | 707/513 |
| 2002/0091871 A1 | * | 7/2002 | Cahill et al. ............. | 709/315 |
| 2002/0103824 A1 | * | 8/2002 | Koppolu et al. ......... | 707/501.1 |

OTHER PUBLICATIONS

Colomb, Robert M. "Use of a Personal Workstation to Access Open Network Services." Australian Computer Journal, vol. 25, No. 1. 1993.*

Meyer, Bertrand. "Object-oriented software Construction." Prentice-Hall, 1988. p. 20-23,73-83.*

Chappell, David. "Understanding ActiveX and OLE, A Guide for Developers & Managers.". 1996. p. 174-178.*

Chen, Weiying. "ActiveX Programming Unleashed." SAMS.Net. Dec. 1996. Chapter 1 and 9.*

* cited by examiner

Primary Examiner—Lewis A. Bullock, Jr.
(74) Attorney, Agent, or Firm—Blakely, Sokoloff, Taylor & Zafman

(57) ABSTRACT

A typical client machine such as a personal computer includes network based application such as the Internet Explorer and a non-network based application such as the spreadsheet. A system and method to dynamically access the objects embedded in the network based application are disclosed. The object can be a Web site including data and the accessing is done to retrieve the data.

17 Claims, 9 Drawing Sheets

Fig. 5

| Client Sync Sample | | | | | _ ☐ ✕ |
|---|---|---|---|---|---|

Navigation

New View: [Account List View ▽] [Go]

View Info

Bus Object: [Account]
Bus Comp: [eEvents Venue Room]
View: [Account List View]
Applet: [Account List Applet]

Field Values: [Get Info]

| Name | Site | URL | Account Team | Main Phone |
|---|---|---|---|---|
| -AAAName162 | | | SADMIN | |
| -AAAName416 | | | SADMIN | |
| -AAAName845 | | | SADMIN | |
| TestAcc1 | | Data | SADMIN | |
| YYY | YYY | 502 | SADMIN | |
| new | | | SADMIN | |
| $$ | dasf | | SADMIN | |

Bus Comp Name: [ ]  [Execute]

[OK] [Cancel]

CLIENT SIDE INTEGRATION FOR NETWORK BASED AND NON NETWORK BASED APPLICATION

FIELD OF THE INVENTION

The present invention pertains to the field of computer software. More particularly, the present invention relates to the client side integration for network based and non-network based applications.

BACKGROUND OF THE INVENTION

Many organizations have a substantial number of computers in operation, often located far apart. For example, a company with many factories may have a computer at each location to keep track of inventories, monitor productivity, and do the local payroll. Initially, each of these computers worked in isolation from the others. For example, there was no communication between the two computers that kept track of the local payrolls at two different factories. At some point, the management decided to connect them to be able to extract and correlate information about the entire company. The network-based applications allow the computers across the network to share resources such as programs, equipment, and data.

A common computer network model includes a client-server model where one computer acts as the client machine and another computer acts as the server machine. The client requests the server to do some work such as transmit data to the client. The server then does the work.

A client machine such as a personal computer typically has included non-network based applications. The client machine may be coupled to a network such as the Internet, a Local Area Network (LAN), a Wide Area Network (WAN), an alternate private or public network, or a combination of these and/or other networks. Over some networks, the World Wide Web sites (Web sites) can be accessed through Internet browsers such as the Netscape Navigator and the Internet Explorer. Examples of non-network based applications include spreadsheets and word processors.

It would be useful to allow for client side integration of network based and non-network based applications.

SUMMARY OF THE INVENTION

A computing system including a network based application and a server is disclosed. The server includes the means for dynamically accessing an object embedded in the network based application.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which

FIG. 5 illustrates an exemplary embodiment of the object in the form of a network based application file.

FIG. 6 illustrates an exemplary embodiment of the client based application file.

DETAILED DESCRIPTION

Figure 1:
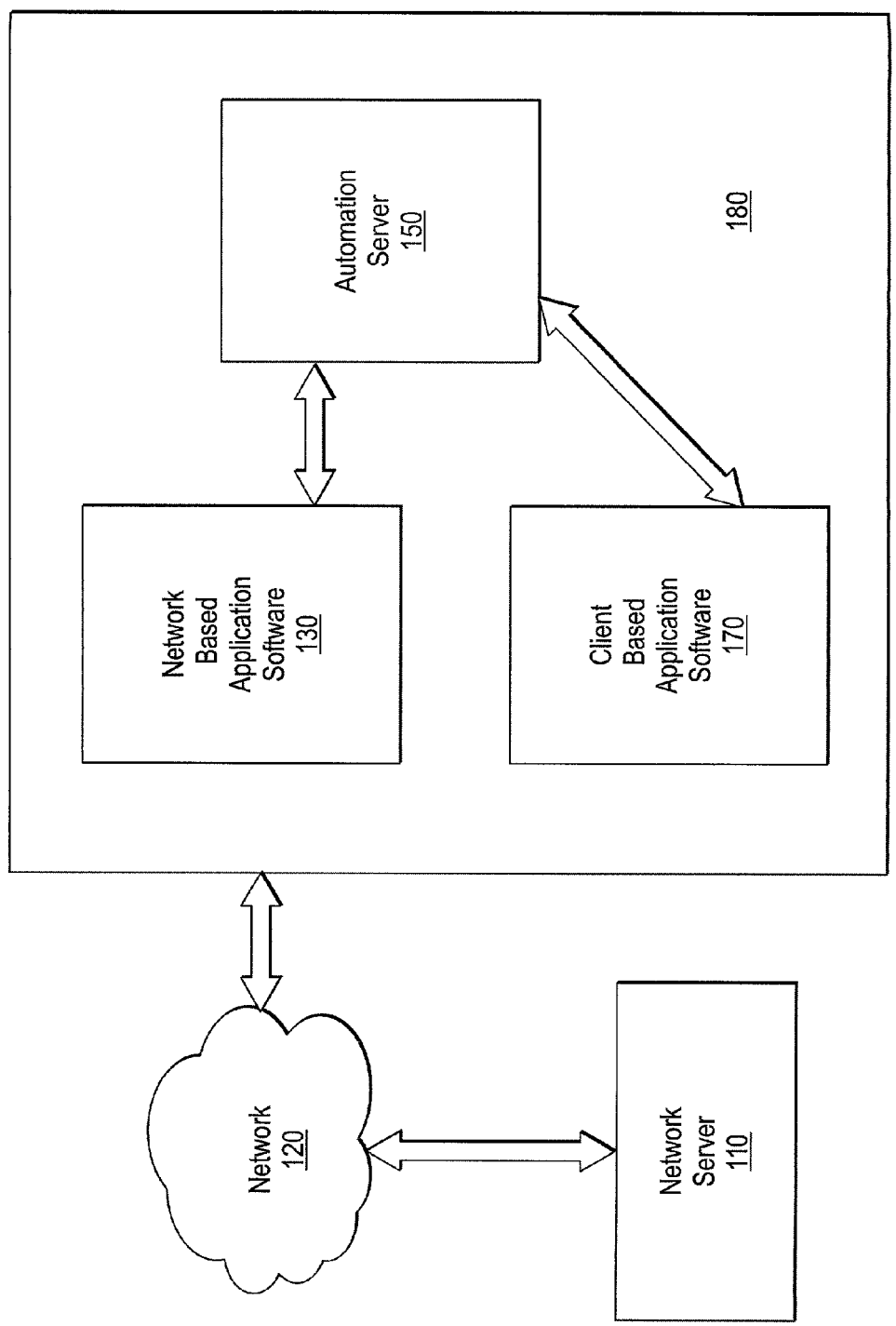
FIG. 1 illustrates an exemplary embodiment of the system to integrate network based and non-network based applications.

A method and system for the client side integration for network based and non-network based applications are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Integration refers to the ability of the non-network based application to access the objects embedded in the network based application, and vice versa. The network based application is widely used by the businesses because it allows the various users across the network to access the same objects simultaneously. The following example of a Web site for the sales department of a company illustrates the functionality and benefits of an interactive network based application. The field sales agents can access the Web site through their personal computers by using an Internet browser such as the Internet Explorer. The sales department Web site is an object because it includes data and methods to manipulate the data. The data can include the sales information input by the sales agents. The methods can include, for example, adding and deleting the data. When an agent makes a sale, he can update the sales department Web site with the details of the sale order. All the sales agents can view this updated information by accessing the sales department Web site. The network based application thus provides the client machines across the network with the ability to access the objects in a network database through a network browser.

An agent may wish to, for example, automatically transfer information from the sales department Web site database to a non-network based application file or another network database. Similarly, the agent may also wish to automatically transfer information from a non-network based application file or a network database to the sales department Web site database. The point is illustrated in the following continuation of the previous example.

After updating the sales department Web site with the new sale order, the agent enters the time that was spent to make the sale in a spreadsheet file residing on the hard drive of his personal computer. The agent wishes to automatically transfer and save the sale order information from the sales department Web site database to the spreadsheet file such that the sale order and the time spent to make the sale can reside in the same spreadsheet file on the hard drive. The prior art does not provide such a capability for the non-network based application to access the objects of a network database, or vice versa.

It is evident that such a capability has countless uses in personal and business worlds. For example, referring to the previous example, the spreadsheet file that can automatically request and receive information from the Internet Web site can save the agent valuable time. As another example, a spreadsheet file can automatically request and receive a customer's checking account transactions information from the bank Web site. The customer can then perform mathematical operations on the received information inside the spreadsheet file. The customer need not be viewing the bank Web site for the spreadsheet file to request and receive the information.

FIG. 1 illustrates an exemplary embodiment of the system to integrate network based and non-network based applications. The client machine 180 is shown including the network based application 130 and the client based application 170 installed therein. In the preferred embodiment, the client based application 170 is non-network based application. It will be appreciated, however, that in an alternate embodiment, the client based application 170 can be network based application. The automation server 150 interfaces to both the network based application 130 and the client based application 170. The network based application 130 interfaces to a network server 110 through the network 120.

The client machine 180 can be a personal computer such as a desktop or laptop computer. In one embodiment, the network based application 130 is Internet based application 130 that can be accessed through the Internet browsers such as the Internet Explorer and the Netscape Navigator. In another embodiment, the network based application 130 is LAN based application 130 that can be accessed through a LAN browser. In one embodiment, the client based application 170 is non-network based application 170 such as a spreadsheet. In another embodiment, the client based application 170 is non-network based application 170 such as a word processor. As stated before, it will be appreciated that in yet another embodiment, the client based application 170 is network based application 170.

In one embodiment, the network server 110 can include a Web site. In another embodiment, the network server 110 can include a LAN server. In one embodiment, the network 120 can include the Internet. In alternate embodiments, the network 120 can include a LAN, a WAN, an alternate private or public network, or a combination of these and/or other networks.

Figure 2:
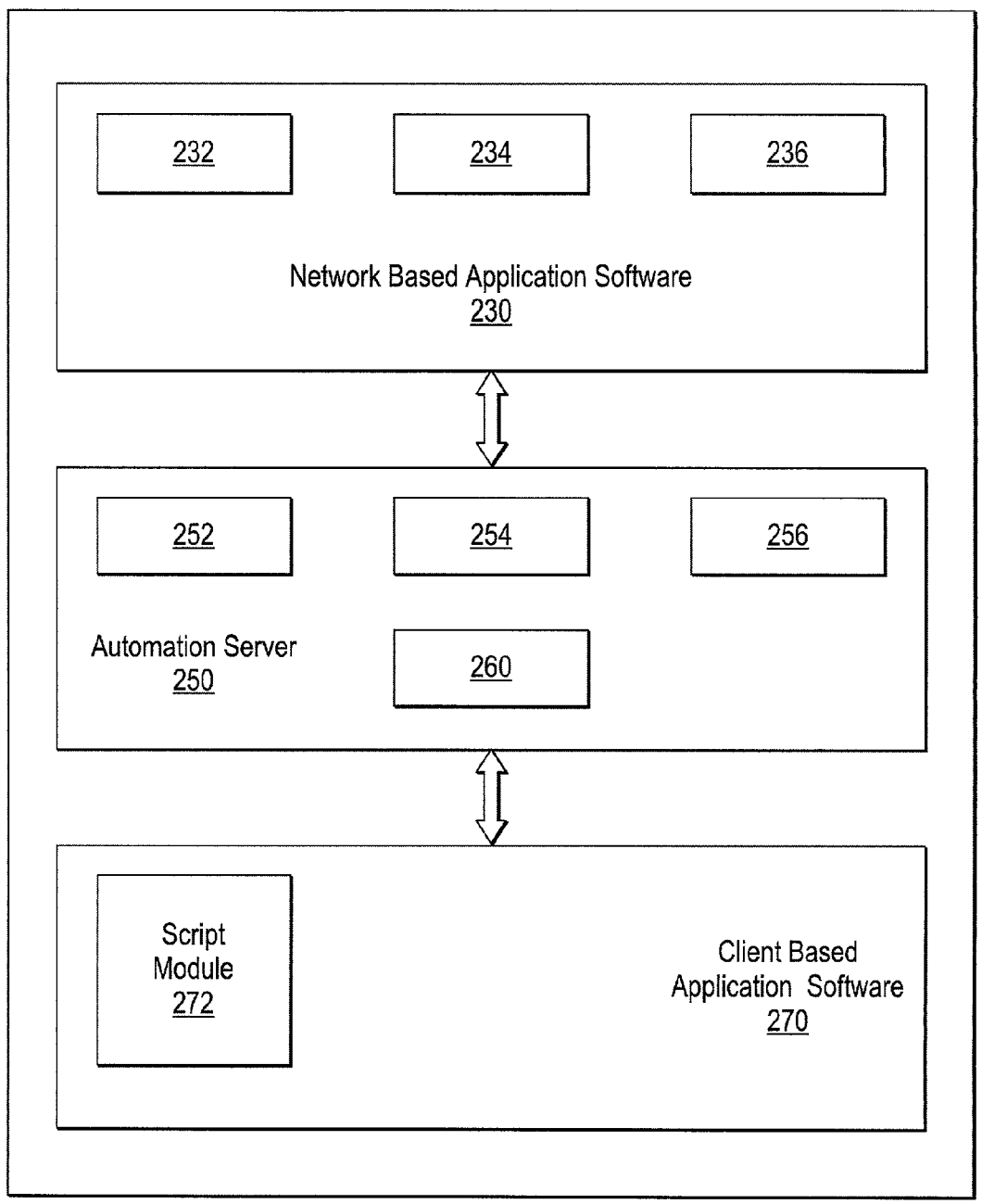
FIG. 2 illustrates an exemplary embodiment of the system of FIG. 1 in detail.

FIG. 2 illustrates an exemplary embodiment of the system of FIG. 1 in detail. The client based application 270 is shown including a script module 272. The script module 272 is configured to call the automation server 250. The call identifies one or more objects 232–236 located in the network based application 230 and states the methods to be performed on those objects 232–236. For example, the object 232–236 can be identified by a Web site address and the method can include retrieving the data from the Web site.

The script module 272 calls by invoking a routine written in a scripting language. In one embodiment, the scripting language is Visual Basic Applications (VBA). In another embodiment, the scripting language is Applescript. The following is an example of a script routine code written using the VBA script language.

Dim first

Set first=first.Getservice("Network.Application")

When this code is executed, the first line declares a variable entitled first. The second line requests that the Getservice method be performed on the data of an object 232–236 entitled Application that resides on the network entitled Network. The Getservice method is defined by the Network application and can include, for example, making the data available such that a third party application can retrieve it. The second line also defines the value of the variable first to be that data.

The automation server 250 is configured to interface between the client based application 270 and the network based application 230. The call from the script module 272 is received by the programmatic interfaces 252–256 corresponding to the object 232–236 identified by the call routine code. For example, the interface 252 corresponds to the Application object. In one embodiment, the automation server 250 can be installed on the client machine 280. In another embodiment, the automation server can be downloaded from the network 120.

A controller 260 controls the interfaces 252–256. In one embodiment, the controller 260 is a Component Object Model (COM) based server such as the Object Linking and Embedding (OLE) server developed by the Microsoft Corporation. In another embodiment, the controller 260 is an OpenDoc based server. The interfaces 252–256 are configured to call the methods and access the properties of the objects 232–236 residing in the network based application 230. The interaction between the automation server 250 and the network based application 230 thus includes the interaction between the programmatic interfaces 252–256 of the automation server 250 and the corresponding objects 232–236 of the network based application 230.

The network based application software 230 is shown including three objects 232–236. It will be appreciated that the alternate embodiments can include a varying number of objects 232–236. The objects 232–236 and some or all of the methods associated with them 232–236 are exposed to the third party application software. In one embodiment, the objects 232–236 include JavaScript objects 232–236. In another embodiment, the objects 232–236 include JScript objects 232–236. In yet another embodiment, the objects 232–236 include ActiveX Data Objects (ADO) 232–236.

Each object 232–236 is associated with a set of methods exposed to the third party software application. For example, the Application object is associated with two methods entitled GetService and NewPropertySet that are exposed to the automation server 250. The GetService method can instantiate and return a new instance of the argument-specified service and the NewPropertySet method can construct a new property set object.

To keep FIG. 2 simple, the objects 232–236 are shown embedded only in the network based application 230 and the script module 272 is shown embedded only in the client based application 270. It will be appreciated, however, that the network based application 230 can also include the script module 272 and the client based application 270 can also include the objects 232–236. The automation server 250 is configured to receive calls from both the script modules 272 and access the exposed objects 232–236 of both the network based 230 and client based 270 application.

Figure 3:
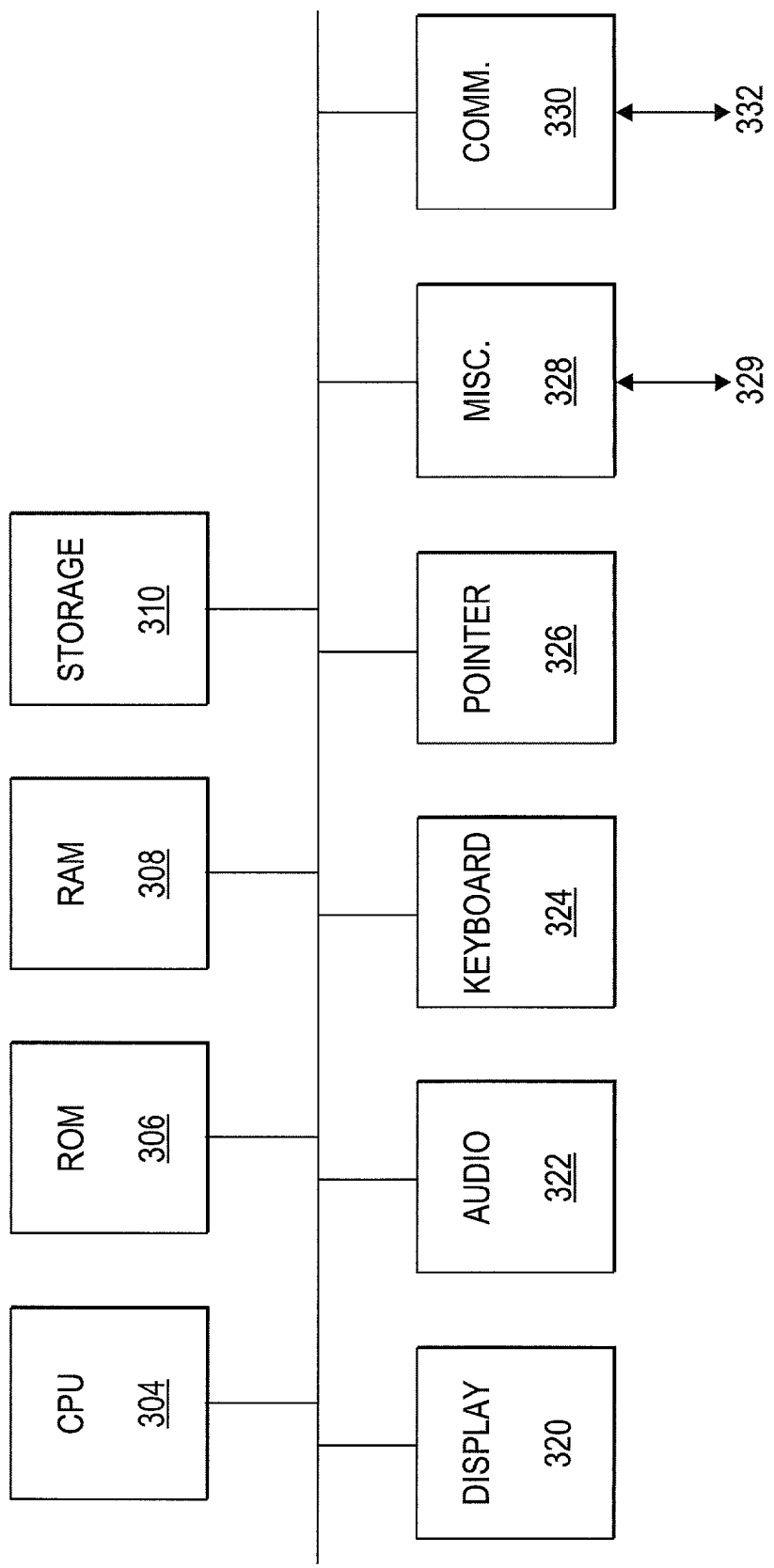
FIG. 3 illustrates an exemplary computer block diagram.

FIG. 3 illustrates an exemplary computer block diagram, which may be representative of the client machine shown in FIG. 1. The block diagram is a high level conceptual representation and may be implemented in a variety of ways and by various architectures. The bus system 302 interconnects a Central Processing Unit (CPU) 304, a ROM 306, a RAM 308, storage 310, a display 320, an audio 322, a keyboard 324, a pointer 326, miscellaneous input/output (I/O) devices 328, and communications 330. The bus system 302 may be for example, one or more of such buses as a system bus, a Peripheral Component Interconnect (PCI), an Advanced Graphics Port (AGP), a Small Computer System Interface (SCSI), and an Institute of Electrical and Electronics Engineers (IEEE) standard number 1394 (Fire Wire). The CPU 304 may be a single, multiple, or even a distributed computing resource. The ROM 306 may be any type of non-volatile memory that may be programmable such as mask programmable and flash. The RAM 308 may be, for example, static, dynamic, synchronous, asynchronous, or any combination. The call routines can be stored in the RAM 308 as a set of instructions to be executed.

The storage 310 may be a Compact Disc (CD), a Digital Versatile Disk (DVD), a hard disk, an optical disk, a tape, a flash, a memory stick or a video recorder. The display 320 might be, for example, a Cathode Ray Tube (CRT), a Liquid Crystal Display (LCD), a projection system or a Television (TV). The audio 322 may be a monophonic, a stereo, or a three dimensional sound card. The keyboard 324 may be a keyboard, a musical keyboard, a keypad, or a series of switches. The pointer 326 may be, for example, a mouse, a touch pad, a trackball, or a joystick. The I/O device 328 might be a voice command input device, a thumbprint input device, a smart card slot, a Personal Computer Card (PC Card) interface, or a virtual reality accessory. The I/O device 328 can be connected via an input/output port 329 to other devices or systems. An example of a miscellaneous I/O device 328 would be a Musical Instrument Digital Interface (MIDI) card with the I/O port 329 connected to the musical instrument(s). The communications device 330 might be, for example, an Ethernet adapter for a local area network (LAN) connection, a satellite connection, a set-top box adapter, a Digital Subscriber Line (xDSL) adapter, a wireless modem, a conventional telephone modem, a direct telephone connection, a Hybrid-Fiber Coax (HFC) connection, or a cable modem. The external connection port 332 may provide for any interconnection, as needed, between a remote device and the bus system 302 through the communications device 330. For example, the communications device 330 might be an IEEE 802.3 (Ethernet) adapter that is connected via the connection port 332 to, for example, an external DSL modem.

Figure 4A:
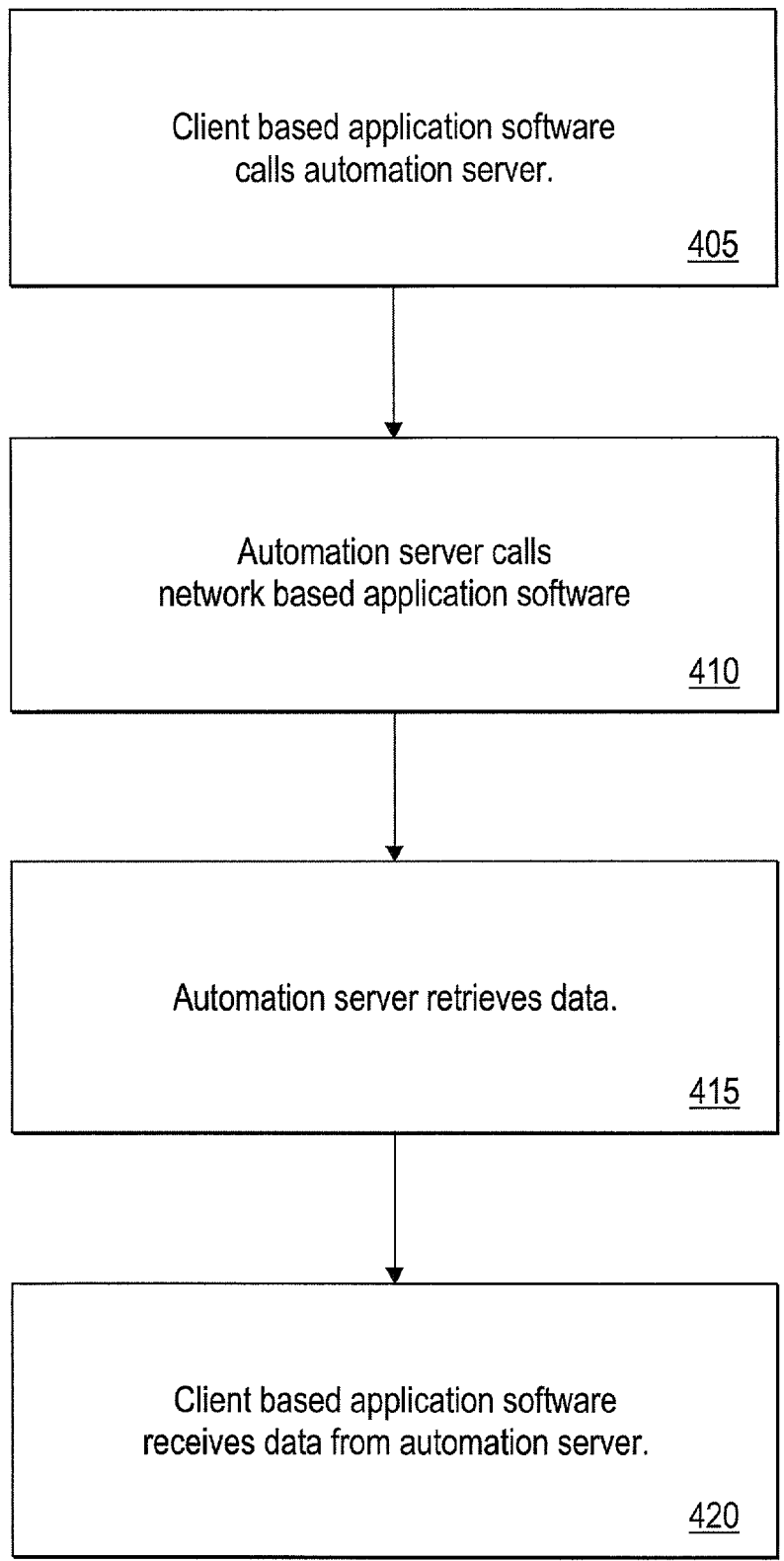
FIGS. 4A, 4B, 4C and 4D illustrate exemplary embodiments of the methods to integrate network based and non-network based applications.
Figure 4B:
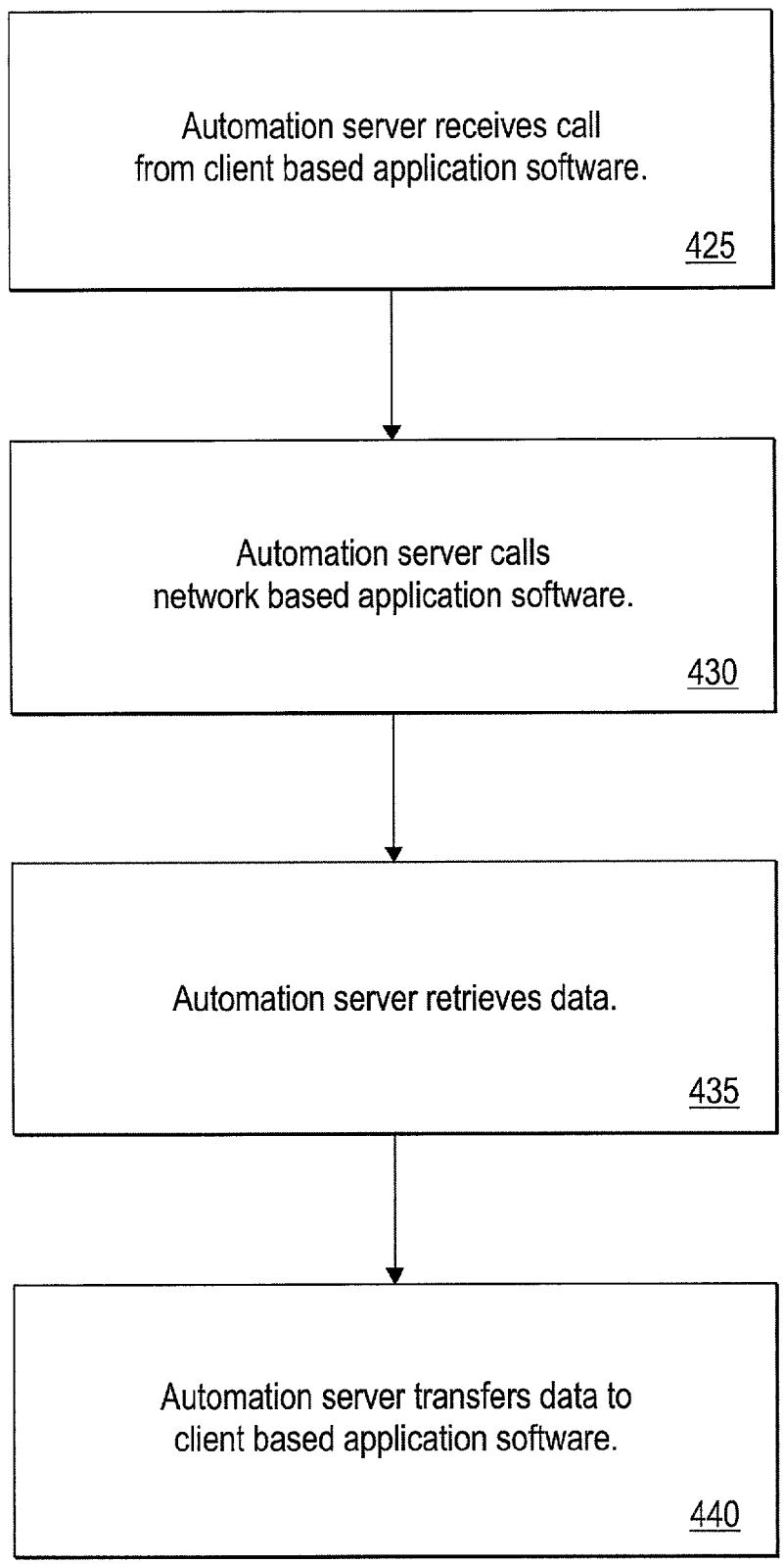
Figure 4C:
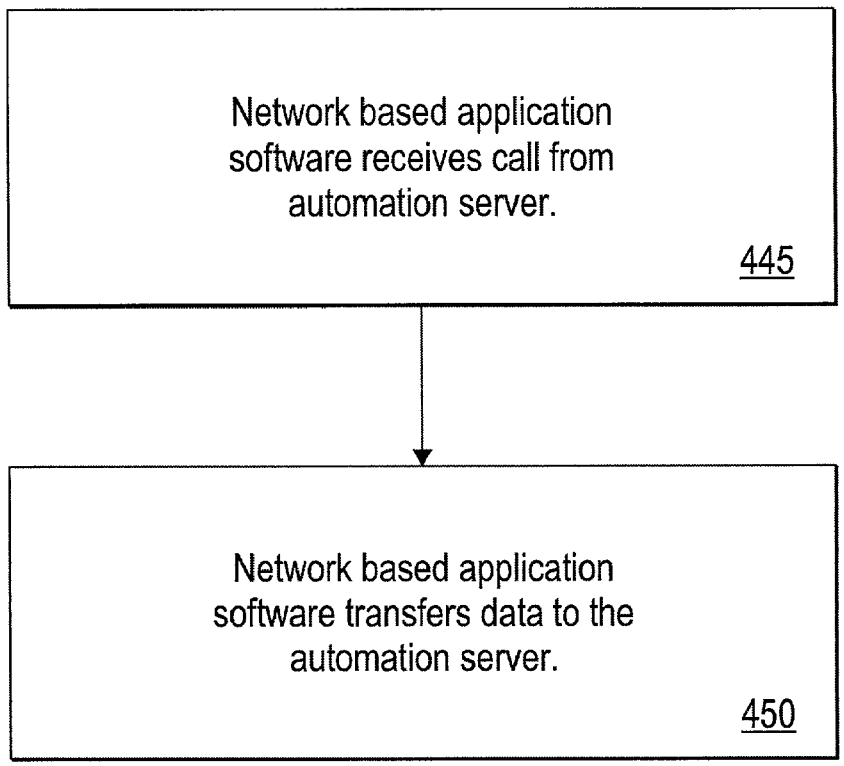

FIGS. 4A, 4B and 4C illustrate exemplary embodiments of the methods to integrate network based and non-network based application. The methods are described with reference to the client machine 280 including the Internet Explorer browser to access the network based application 230 and the OLE server 260. It will be appreciated, however, that the methods are applicable to other systems including a variety of network browsers or other interfaces to a network, and automation servers. The methods are illustrated by way of examples in which client based and network based application retrieve data from an object.

Referring to FIG. 4A, at block 405, the script module of the client based application calls the automation server to request data from an object embedded in the network based application. At block 410, the automation server calls the network based application. At block 415, the automation server interface corresponding to the object accesses the object and retrieves the data. At block 420, the automation server transfers the retrieved data to the client based application.

Figure 5:
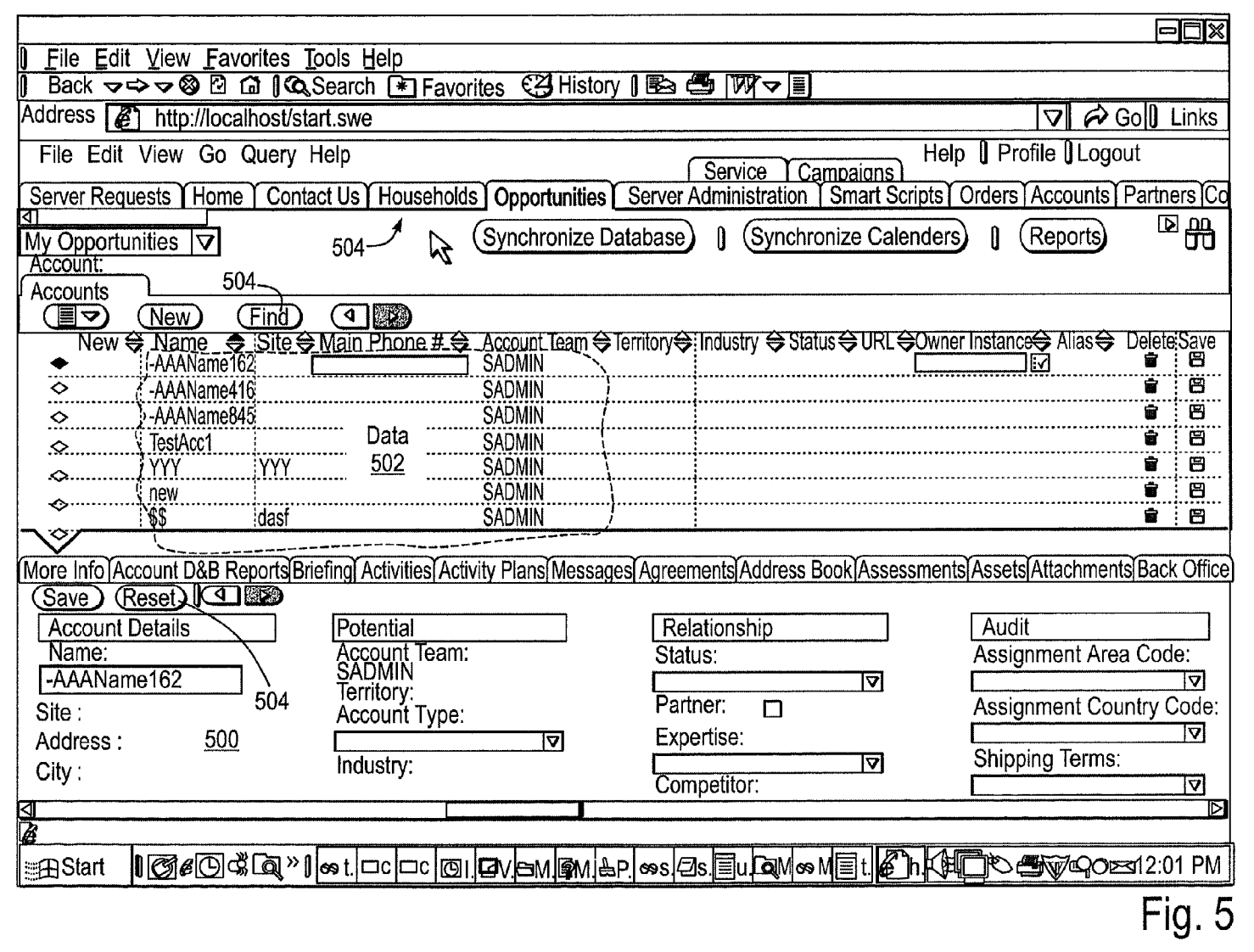

FIG. 5 illustrates an exemplary embodiment of the object in the form of a network based application file. The object 500 includes the data 502 and the methods 504.

FIG. 6 illustrates an exemplary embodiment of the client based application file 600 including the retrieved data 500.

Referring to FIG. 4B, at block 425, the automation server receives a call from the script module of the client based application requesting data from an object embedded in the network based application. At block 430, the automation server calls the network based application. At block 435, the automation server interface corresponding to the object accesses the object and retrieves the data. At block 440, the automation server transfers the retrieved data to the client based application.

Referring to FIG. 4C, at block 445, the object embedding in the network based application receives a request to perform the method of transferring the object data to the automation server. At block 450, the object transfers the object data to the automation server.

Figure 4D:
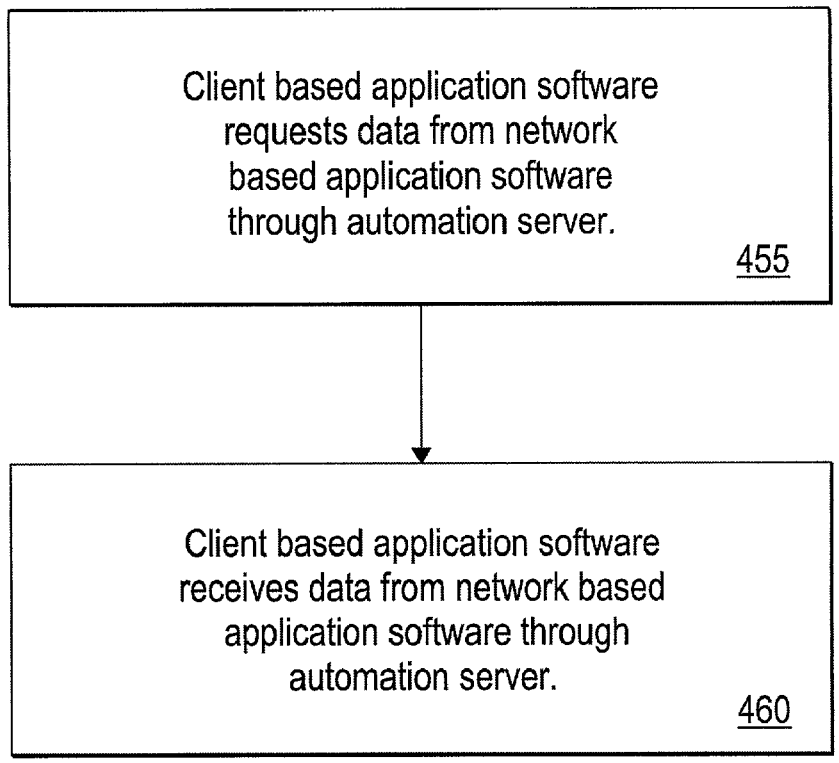

Referring to FIG. 4D, at block 455, the script module of the network based application requests the automation server to retrieve data from an object embedded in the network based application. At block 460, the client based application receives the data retrieved from the network based application through the automation server.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIGS. 1, 2, 3, 4A, 4B and 4C may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc.) as taken in action or causing a result. Such expressions are merely a shorthand way of saying that execution of the software by a computer causes the processor of the computer to perform an action or produce a result.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIGS. 1, 2 and 3 may be integrated into components, or may be subdivided into components. Similarly, the blocks of FIGS. 4A, 4B and 4C represent portions of a method which, in some embodiments, may be reordered or may be organized in parallel rather than in a linear or step-wise fashion. The present specification and figures are accordingly to be regarded as illustrative rather than restrictive.

What is claimed is:

1. A computing system comprising:
   a network based application to access a datum in a network database across a network to generate an object; and
   a server to receive a request identifying the object from a non-network based application and to respond to the request by,
   communicating with the network based application to dynamically access the object for the datum, and
   transmitting the datum to the non-network based application;
   wherein the server is capable of communicating with the non-network based application to access an object of the non-network based application in response to a request from the network based application.

2. The computing system of claim 1, wherein the computing system includes a personal computer.

3. The computing system of claim 2, wherein the server and the network based applications are installed on the personal computer.

4. The computer system of claim 1, wherein the object includes the datum and a method to manipulate the datum.

5. The computer system of claim 4, wherein the server is to access the object to retrieve the datum.

6. The computer system of claim 5, wherein the server is to transmit the retrieved datum to the non-network based application.

7. A computer-implemented method for a server, comprising:
   receiving a request identifying an object of a network based application from a non-network based application, the object including a datum obtained from a network database across a network by the network based application;
   in response to the request,
   dynamically accessing the object for the datum through communicating with the network based application, and
   transferring the datum to the non-network based application; and
   communicating with the non-network based application to access an object of the non-network based application in response to a request from the network based application.

8. The computer-implemented method of claim 7, wherein the object includes the datum and a method to manipulate the datum.

9. The computer-implemented method of claim 8, wherein transferring the datum of the object further comprises:
   retrieving the datum of the object; and
   transmitting the retrieved datum to the non-network based application.

10. A computing system comprising:
    means for receiving a request identifying an object associated with a network based application from a third party application, wherein the third party application comprises a non-network based application, and the object associated with the network based application includes a datum obtained from a network database across a network by the network based application;
    means for dynamically accessing the object associated with the network based application for the datum through communicating with the network based application;
    means for transmitting the datum to the third party application as a response to the request of the third party application; and
    means for accessing an object of the third party application through communicating with the third party application in response to a request from the network based application.

11. The computing system of claim 10, wherein the computing system, the network based application and the third party application are installed on a personal computer.

12. The computing system of claim 10, wherein the network based application includes a World Wide Web site.

13. The computing system of claim 10, wherein the object is a JavaScript object.

14. The computing system of claim 10, wherein the computing system includes a programmatic interface to communicate with the object.

15. A computer-readable medium providing instructions, which if executed by a processor, causes the processor to perform a method for a server, comprising:
    receiving a request identifying an object associated with a network based application from a non-network based application, the object associated with the network based application including a datum obtained from a network database across a network by the network based application;
    in response to the request,
        dynamically accessing the object associated with the network based application for the datum through communicating with the network based application, and;
        transferring the datum to the non-network based application; and
    communicating with the non-network based application to access an object of the non-network based application in response to a request from the network based application.

16. The machine-readable medium of claim 15, wherein the object includes the datum and a method to manipulate the datum.

17. The machine-readable medium of claim 16, wherein transferring a datum of the object further comprises:
    retrieving the datum of the object; and
    transmitting the retrieved datum to the non-network based application.

* * * * *